J. TOLMAN.
CHICKEN BROODER.
APPLICATION FILED APR. 19, 1909.
1,044,605.
Patented Nov. 19, 1912.
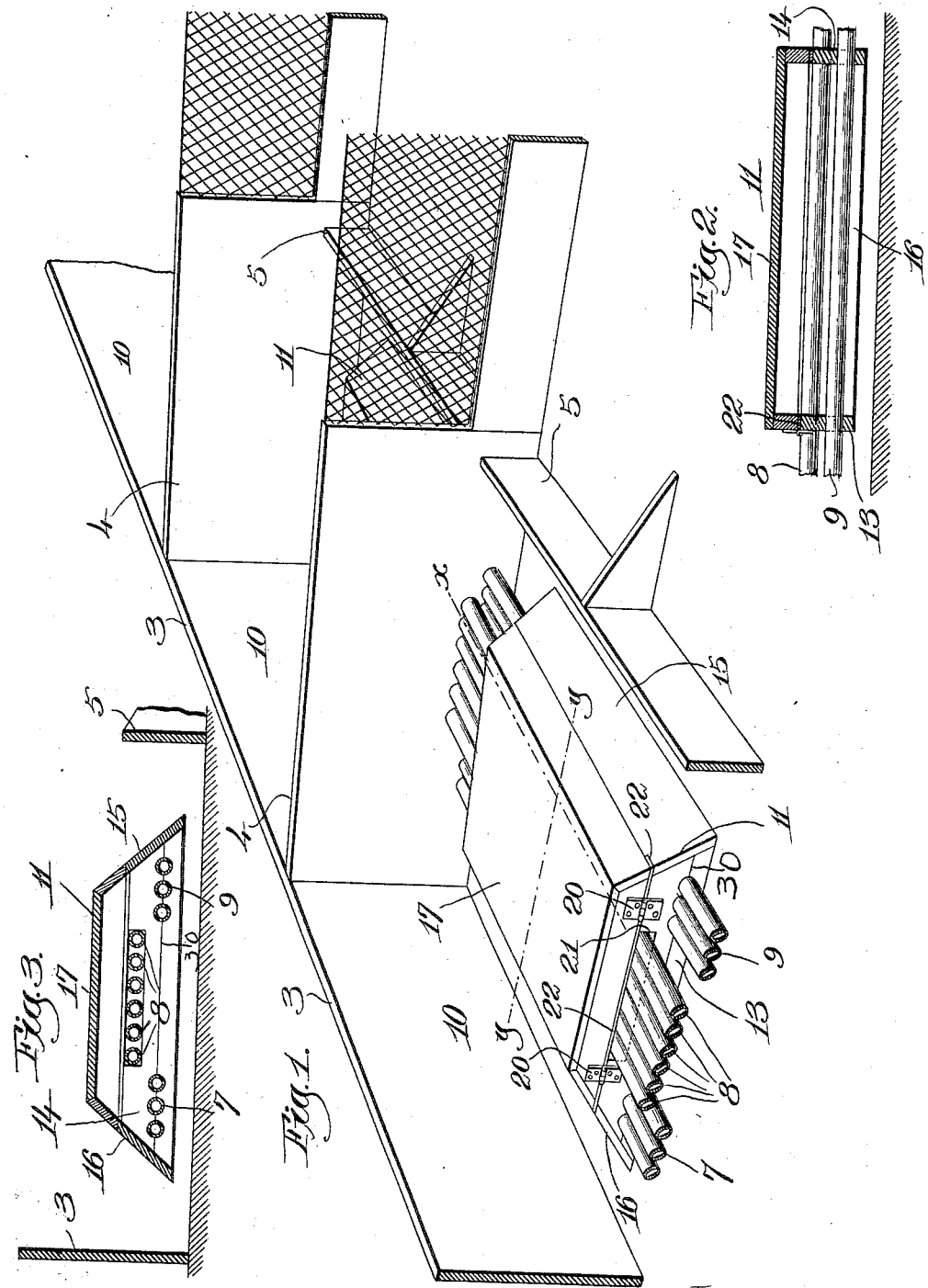

UNITED STATES PATENT OFFICE.

JOSEPH TOLMAN, OF NORWELL, MASSACHUSETTS.

CHICKEN-BROODER.

1,044,605.

Specification of Letters Patent. Patented Nov. 19, 1912.

Application filed April 19, 1909. Serial No. 490,736.

*To all whom it may concern:*

Be it known that I, JOSEPH TOLMAN, a citizen of the United States, residing at Norwell, county of Plymouth, and State of Massachusetts, have invented an Improvement in Chicken-Brooders, of which the following description, in connection with the accompanying drawing, is a specification, like letters on the drawing representing like parts.

This invention relates to chicken brooders and has for its object to provide a brooder which presents for the newly-hatched chicken conditions as nearly as possible like the conditions presented by a mother hen in caring for her chickens.

It is now customary to raise newly-hatched chickens in a brooder house, the interior of which is usually divided into compartments called "runs," each adapted to hold 150 or 200 chickens. A newly-hatched chicken requires a temperature of 95 to 103° F., and to secure this temperature, it has been customary to place steam or other heating pipes in the various compartments or runs at a distance of two or three inches from the floor, so that the temperature of the air immediately beneath the pipes will be the required temperature for the chickens. Owing to the fact that heat rises, however, it has been necessary to keep the entire interior of the building heated to a temperature of 80 or 90° in order to secure the required 95 to 103° F. temperature immediately adjacent the steam pipes. It is rather difficult, however, to raise healthy chickens under conditions where it is necessary to maintain the temperature of the room at such a high point.

In making my invention I have endeavored to provide a novel form of brooder by which the desired temperature of 95 to 103° may be maintained immediately adjacent the steam pipes where the chickens naturally brood, without requiring that the temperature of the room should be much above 60° F. My improvements enable me to keep the windows of the brooder house open at almost any outside temperature, thus keeping the air in the house fresh and cool and obviating the stuffy, hot and unhealthy conditions which prevail where the temperature of the room is at 80° or so.

I attain the object of my invention by providing a novel arrangement of hovers, each of which is situated in a run or inclosure through which the heating pipes pass and which is so situated that an open uncovered space exists between each side of the hover and the corresponding wall of the run, and so that the lower edge of the hover on each side thereof is situated a sufficient distance above the floor of the run to permit chickens to readily pass thereunder and to permit a free circulation of air on all sides. I have found that with this arrangement the temperature of the room generally may be such as to present healthy conditions for the chickens to grow in, and at the same time the chicks under the hover have a plentiful supply of fresh air.

Referring to the drawings wherein I have shown one embodiment of my invention, Figure 1 is a perspective view showing a few runs or compartments with my improvements applied thereto; Fig. 2 is a section on the line $x$, Fig. 1; Fig. 3 is a section on the line $y$—$y$, Fig. 1.

The different runs or compartments are formed by the walls or partitions 3, 4, 5, the partitions 5 preferably being movable partitions, so that as the chickens grow the size of the compartments may be gradually enlarged. This construction is such as is usually found in brooders and forms no part of my present invention. The compartments of my improved brooders are heated by means of heating pipes 7, 8, 9. I prefer to arrange the pipes as shown in the drawing, that is, with the feed pipes 8 leading from the heater situated in the center and with the return pipes 7, 9 situated either side of the feed pipes. I have herein shown the same number of feed pipes and return pipes, and half of the return pipes are preferably placed on one side of the feed pipes, and the other half on the other side. The feed pipes will obviously be hotter than the return pipes, and in order to equalize the heat I propose to place the return pipes slightly nearer the floor than the feed pipes, all as plainly seen in the drawings.

Situated within each run 10 is what I have termed a "hover" 11 which is formed with a heat-retaining chamber on its under side that retains and concentrates the heat generated in the pipes and prevents it from escaping to the upper part of the building where it does no effective work in keeping the chickens warm. It is possible to make this hover in a variety of ways without departing from the invention. The hover herein illustrated comprises the two end walls 13, 14 through which the pipes 7, 8, 9 extend, the side walls 15, 16 which are preferably inclined, and the top wall 17 which is situated a slight distance above the feed pipes 8. The hover is so supported that the lower edges of the sides and ends are situated a slight distance, say two or three inches, from the floor, thus affording ample room for the chickens to pass in under the hover or to pass out therefrom. A hover having this construction presents on its under side a chamber through which the heating pipes pass and which is easily heated and maintained heated even though the temperature of the room generally is moderate. In fact I have found from experiments that it is possible to maintain a temperature of 95 to 103° beneath the hover with the temperature of the room generally at only about 60°.

In the preferred embodiment of my invention the hover will have such a size that a considerable space, say six to ten inches, will exist between the edges or walls of the hover and the walls of the compartment or run 10, and in this space I find that the temperature is somewhere in the neighborhood of 80° at the ends of the hover and is somewhat lower at the sides of the hover.

I prefer to so support the hover that an unobstructed space of two to three inches is provided entirely around the hover between the lower edges of the sides and ends and the floor, so that the chickens can freely pass in and out from under the hover, and this may be done by sustaining the hover on the heating pipes. As herein shown the ends 13 and 14 are each provided with a recess 21 in which the feed pipes 8 are received, and with apertures through which the return pipes 7 and 9 extend. Each end is shown as divided along the line 30 to facilitate applying it to the pipes, the two sections being secured together in any appropriate way. I have shown a strap 22 secured to the top of each end and overlying the feed pipes 8. This particular construction is not essential to the invention however.

I prefer to make the top of the hover movable so that access can be had to the interior of the hover through the top thereof. It is convenient to hinge the top to the sides so that it forms a cover for the hover. As herein shown the top 17 is hinged to one end 13 by hinges 20, although it is possible to secure the cover to the walls of the hover in other ways without departing from the invention.

The construction of my improved hover is such that it is warmest at the center of the hover and the temperature gradually decreases toward the edges of the hover. This is due partly to the construction of the hover and partly to the fact that the feed pipes which are hottest are located in the center with the return pipes on either side. When the invention is in use the chickens will pass in and out from under the hover exactly as they pass in and out from under the mother hen and in doing so they are subjected to almost exactly the same temperature conditions as when they are brooded by the mother hen. Owing to the fact that the heat-retaining chamber on the under side of the brooder is open at all sides to the space within the inclosure surrounding the hover, the air will be maintained fresh at all times under the hover, and yet at the temperature required by the chickens.

While I have described herein one embodiment of my invention I do not wish to be limited to the constructional details shown.

Having fully described my invention, what I claim as new and desire to secure by Letters Patent is:—

1. In a brooder, the combination with walls forming a run or inclosure which is permanently open at the top, of heating pipes extending through said run, a hover within the inclosure and through which the pipes pass, said hover having all of its sides spaced from the walls of the run thereby to form a permanently open uncovered space between each side of the hover and the corresponding wall of the run, the lower edge of the hover on each side thereof being situated a sufficient distance above the floor of the run to permit chickens to readily pass thereunder whereby the chickens may pass into and out from the hover on all sides thereof and a free circulation of air is permitted on all sides.

2. In a brooder, the combination with walls forming a run or inclosure having a permanently-open top, of heating pipes extending through said run and comprising supply pipes and return pipes arranged with the return pipes on both sides of the supply pipes and parallel thereto, a hover separate from said walls and covering a portion of said pipes, said hover being smaller than the run whereby an open uncovered space exists between each side of the hover and the corresponding wall of the run and the lower edge of the hover being situated above the floor of the run thereby to leave an unobstructed open space beneath each side of the hover through which chickens may readily pass and which permits a free circulation of air on all sides.

3. In a brooder, the combination with walls forming a run or inclosure which is permanently open at the top, of heating pipes extending through said run, a hover within the inclosure and through which the pipes pass, said hover having all of its sides spaced from the walls of the run thereby to form a permanently open uncovered space between each side of the hover and the corresponding wall of the run, the lower edge of the hover being uniformly spaced from the floor of the run a sufficient distance to readily permit chickens to pass thereunder and to form an unobstructed space which permits free circulation of the air from all directions.

In testimony whereof, I have signed my name to this specification, in the presence of two subscribing witnesses.

JOSEPH TOLMAN.

Witnesses:
  LOUIS C. SMITH,
  THOMAS J. DRUMMOND.

Copies of this patent may be obtained for five cents each, by addressing the "Commissioner of Patents, Washington, D. C."